US012697268B2

(12) United States Patent
Cho

(10) Patent No.: US 12,697,268 B2
(45) Date of Patent: Aug. 4, 2026

(54) SPINE EXERCISE EQUIPMENT

(71) Applicant: David Hyun Jong Cho, Citrus Heights, CA (US)

(72) Inventor: David Hyun Jong Cho, Citrus Heights, CA (US)

( * ) Notice: Subject to any disclaimer, the term of this patent is extended or adjusted under 35 U.S.C. 154(b) by 1090 days.

(21) Appl. No.: 17/406,697

(22) Filed: Aug. 19, 2021

(65) Prior Publication Data

US 2023/0054542 A1 Feb. 23, 2023

(51) Int. Cl.

| | |
|---|---|
| ***A61H 1/02*** | (2006.01) |
| ***A61H 1/00*** | (2006.01) |
| ***A61H 15/00*** | (2006.01) |

(52) U.S. Cl.

CPC ........... *A61H 1/0292* (2013.01); *A61H 1/005* (2013.01); *A61H 15/0078* (2013.01); *A61H 2201/1607* (2013.01); *A61H 2201/1623* (2013.01); *A61H 2201/163* (2013.01); *A61H 2203/0456* (2013.01)

(58) Field of Classification Search

CPC .. A61H 1/0292; A61H 1/005; A61H 15/0078; A61H 2201/1607; A61H 2201/1623; A61H 2201/163; A61H 2203/0456; A61H 2201/149; A61H 2001/0233; A61H 2201/1215; A61H 2201/1664

See application file for complete search history.

(56) References Cited

U.S. PATENT DOCUMENTS

| | | | | |
|---|---|---|---|---|
| 1,978,223 A * | 10/1934 | Parker | A61H 23/02 601/103 |
| 5,862,550 A * | 1/1999 | Cosani | A61G 7/0573 5/934 |
| 10,675,215 B1 * | 6/2020 | Yoon | A61H 1/008 |
| 2004/0002668 A1 * | 1/2004 | Mahan | A61H 7/004 601/87 |
| 2014/0309693 A1 * | 10/2014 | Zhang | A61H 1/00 606/239 |
| 2016/0008203 A1 * | 1/2016 | Kaczmarek | A61H 1/003 601/24 |
| 2020/0297570 A1 * | 9/2020 | Lee | A61H 1/008 |

FOREIGN PATENT DOCUMENTS

| | | | | |
|---|---|---|---|---|
| CA | 2612786 A1 * | 5/2008 | A61H 1/005 |
| CN | 108771604 A * | 11/2018 | |
| KR | 20040098831 A * | 11/2004 | |

* cited by examiner

*Primary Examiner* — Timothy A Stanis
*Assistant Examiner* — Matthew R Moon
(74) *Attorney, Agent, or Firm* — Innovation Counsel LLP

(57) ABSTRACT

A spine treating apparatus is presented. The apparatus includes a plurality of frames arranged in an x-direction to form a surface, suspension pieces supporting the plurality of frames, a rotator on which the suspension pieces rest, and a motor that turns the rotator about an axis that extends in the x-direction. The rotator has an uneven outer surface such that when the motor turns the rotator, the suspension pieces move according to the contours of the rotator's uneven outer surface. The movement of the suspension pieces treats the back of a patient lying on the surface. A method of treating a user's spine is also presented. The method entails arranging frames to form a surface, providing a suspension piece for each of the frames to support the frames, providing a rotator with an uneven surface to contact the suspension piece, and turning the rotator.

18 Claims, 12 Drawing Sheets

SPINE EXERCISE EQUIPMENT

TECHNICAL FIELD

The disclosure relates to a method and apparatus for physical exercise and restoration, and specifically for maintenance and restorative therapy involving a patient's back.

BACKGROUND

There are many aspects of modern day life and aging in general that compromise a person's sense of well-being and quality of life. For example, many jobs today require a person to sit in the same position for unnaturally long periods of time or engage in repetitive motion that causes muscle strain and discomfort. As people age, these "abuses" of our physical bodies may result in loss of muscle tone, muscle pain, joint pain, and stiffness. In extreme cases, the pain and stiffness result in an individual having to rely on wheelchairs and walkers to move around, limiting the types of activities the individual can engage in and taking away the individual's sense of independence and energy.

Restorative therapy improves one's mobility (walking, repositioning, standing up, sitting down, and transferring from one place to another). By allowing a person to move around more comfortably and independently, restorative therapy greatly improves the person's sense of well-being. There are restorative therapy services offered in forms of exercises, treatments, and massages. However, there seems to be a continuing need for improved methods and tools to bring people to the level of mobility and flexibility that they desire.

The importance of spine in a person's mobility has been known for a long time. Many mobility issues, for example, may be addressed by treatment of a person's back and spine. While visits to chiropractors, physicians, and physical therapists may be helpful in improving one's spinal mobility, new tools, methods, and equipment that cost-effectively and conveniently achieve this end are desired.

SUMMARY OF THE DISCLOSURE

According to one aspect of the disclosure, a spine treating apparatus is presented. The apparatus includes a plurality of frames arranged in an x-direction to form a surface, a plurality of suspension pieces supporting the plurality of frames, a rotator on which the plurality of suspension pieces rest, and a motor that turns the rotator about an axis that extends through a length of the rotator. The rotator has an uneven outer surface.

According to another aspect of the disclosure, a method of treating a user's spine is presented. The method entails arranging a plurality of frames to form a surface, providing a suspension piece having a first end and a second end for each of the plurality of frames, wherein the first end of the suspension piece supports one of the plurality of frames. A rotator with an uneven surface is provided, wherein the second end of the suspension piece contacts the rotator. A motor turns the rotator about an axis that extends parallel to a direction in which the plurality of frames are arranged.

DETAILED DESCRIPTION

The method and apparatus of this disclosure stem from the understanding that mobility improvement can be achieved through spine flexibility. A user can lie down on the apparatus that is disclosed and turn it on to have the apparatus stretch and twist her vertebrae in different directions, "exercising" her spine.

In addition, the method and apparatus disclosed herein may also be used by healthy people for spine and mobility maintenance. The spine is the pillar of a human body, and it is often said that the spine is the pillar of the mind as well. Hence, even before the spine becomes stiff or develops problems, it is important to maintain spine flexibility through regular exercise. The brain and the spinal cord make up a person's central nervous system, which feeds and controls the peripheral nervous system and all organs. Many diseases are caused by problems in the central and peripheral nervous systems. In fact, a person's biological age—as opposed to chronological age—may be determined by spine flexibility. Maintaining the spine in a healthy, flexible condition contributes tremendously to a person's physical health and mental clarity.

Figure 1A:
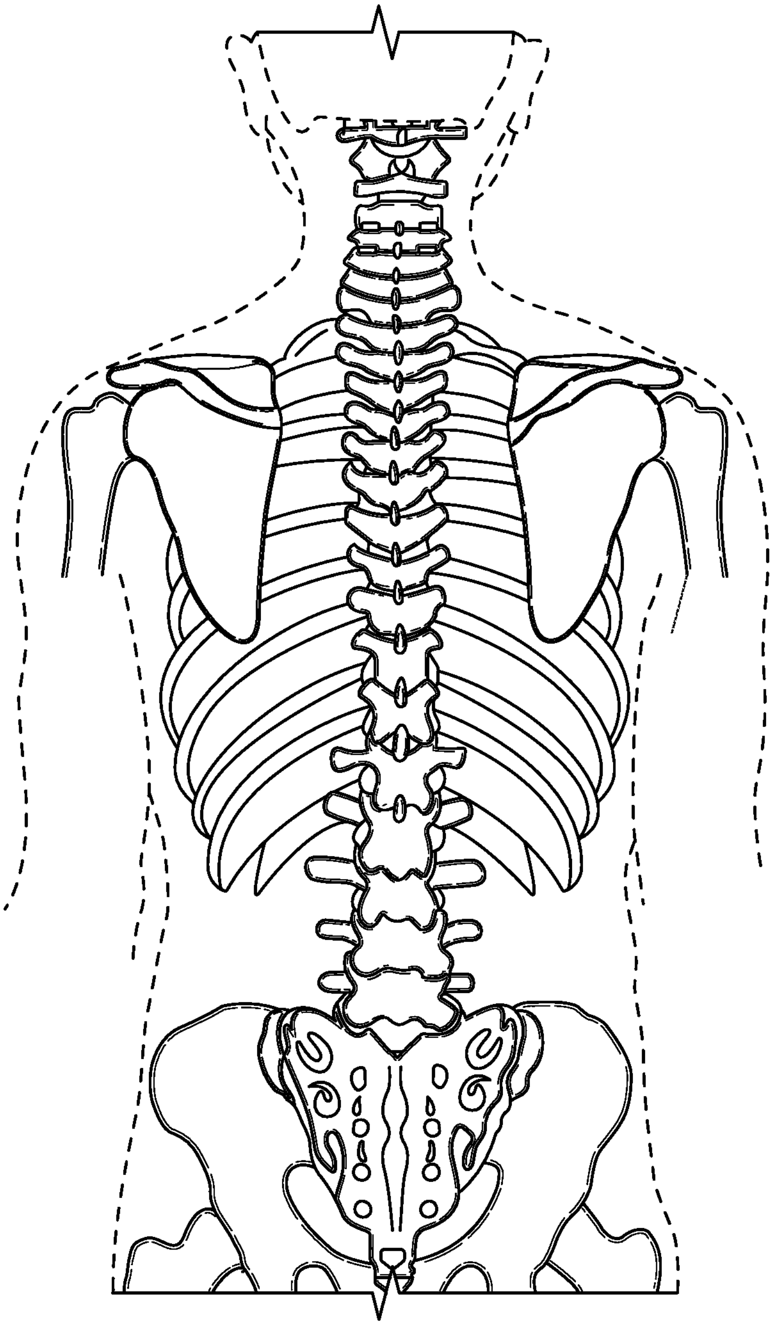
FIG. 1A depicts a back view of a human spine.
Figure 1B:
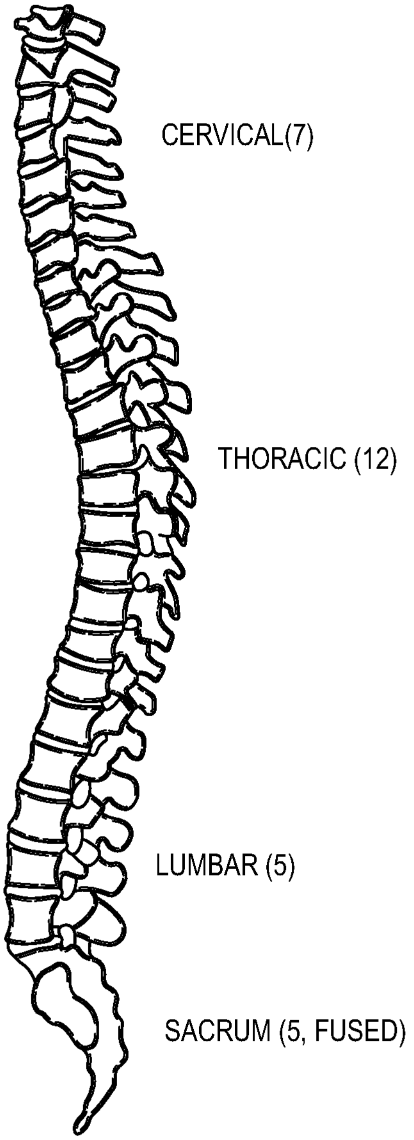
FIG. 1B depicts a side view of a human spine.

FIG. 1A and FIG. 1B depict a back view and a side view of the human spine, respectively. The spine supports a person's body and enables movements such as walking, twisting, etc. The spine includes vertebrae, disks, nerves, and the spinal cord. As shown, the spine may be divided into four sections: cervical vertebrae, thoracic vertebrae, lumbar vertebrae, and the sacrum. Although not explicitly shown, there is also the coccyx (tailbone) below the sacrum. The vertebrae are small bones that are stacked to form the spinal canal that houses and protects the spinal cord and nerves. With the exception of the sacrum and the coccyx, which are the vertebrae farthest from the neck (cervical) area that do not move, the vertebrae move with respect to each other, cushioned by intervertebral disks that absorb shock. Ligaments connect the vertebrae to hold the spine in position.

The cervical (neck) section includes seven vertebrae. The vertebrae in the cervical section allow a person to turn, tilt, and nod her head. The thoracic (middle back) section includes 12 vertebrae, and the lumbar (lower back) section includes 5 vertebrae. The sacrum and the coccyx include five and four vertebrae, respectively.

Figure 2:
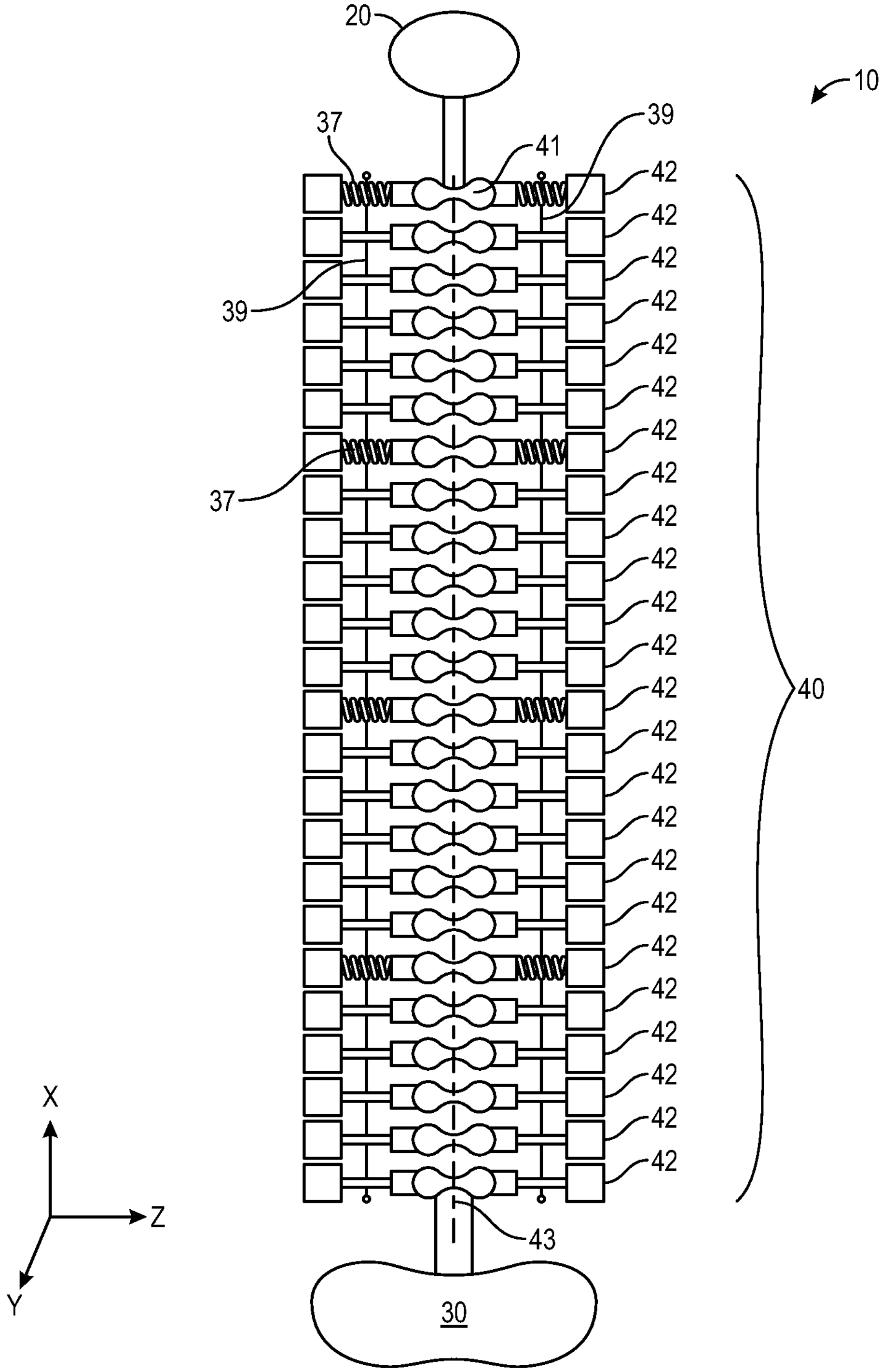
FIG. 2 depicts a top view of a spine exerciser in accordance with an embodiment of the disclosure.

FIG. 2 depicts a top view of a spine exerciser 10 in accordance with an embodiment of the disclosure. As shown, the spine exerciser 10 includes a head rest 20, a hip support 30, and a spine support surface 40 between the head rest 20 and the hip support 30. A user would lie down on the spine exerciser 10. The positions of the head rest 20 and the hip support 30 may be adjustable, to accommodate the different builds and heights of users. In the embodiment shown, there are 24 frames 42 arranged in the x-direction to form the support surface 40 that supports the user's back. On each frame 42, there is a vertebrae support 41 that can slide, stretch, or otherwise move in the z-direction while staying coupled to the frame 42. The 24 vertebrae supports 41 are generally spaced and sized to support the seven cervical vertebrae, the 12 thoracic vertebrae, and the five lumbar vertebrae of the user (24 vertebrae all together).

Although the frames 42 are evenly spaced apart in the embodiment shown, this is not a limitation and spacing between the frames 42 may be adjusted. The vertebrae support 41 are not fixed in the positions on the frames 42 depicted in FIG. 2. Rather, each vertebrae support 41 can individually move in the z-axis, while remaining coupled to the respective frame 42 that it is on. Furthermore, the frames 42 may individually rotate/turn around a vertebrae axis 43, depicted with broken lines in FIG. 2. The frames 42 and the vertebrae support 41 may move in response to user's movement, giving the user a "cushioned" feel while supporting each vertebrae. FIG. 8A, FIG. 8B, FIG. 9A, FIG. 9B, FIG. 10B, and FIG. 10C below depict examples of the ways in which the frames 42 and the vertebrae supports 41 may move with the user.

In some embodiments, the frames 42 are connected by an elastic string 39 on each side of the vertebrae axis 43. The elastic string 39 maintains a predetermined level of tension so that a certain amount of force is required to move the frames 42 relative to one another. For example, if a user lying on the support surface 40 wants to twist her body in the manner depicted in FIG. 10B and FIG. 10C, the frames 42 would move individually so that they no longer form a flat surface together. The elastic strings 39 ensure that the frames 42 do not freely move individually without a certain amount of force applied on them.

Figure 9A:
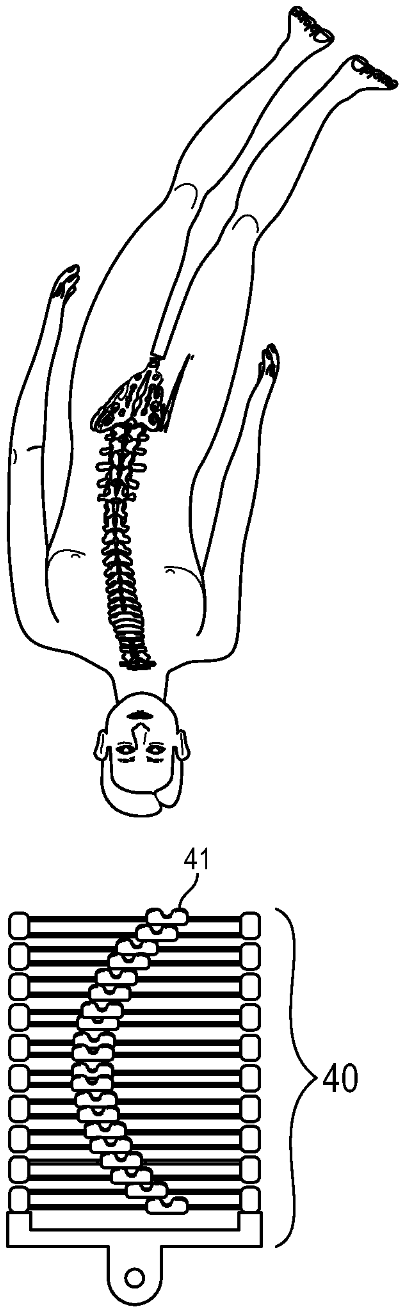
FIG. 9A and FIG. 9B depict vertebrae supports moved on the frames in to stretch the user's spine sideways, in accordance with an embodiment of the disclosure.
Figure 9B:
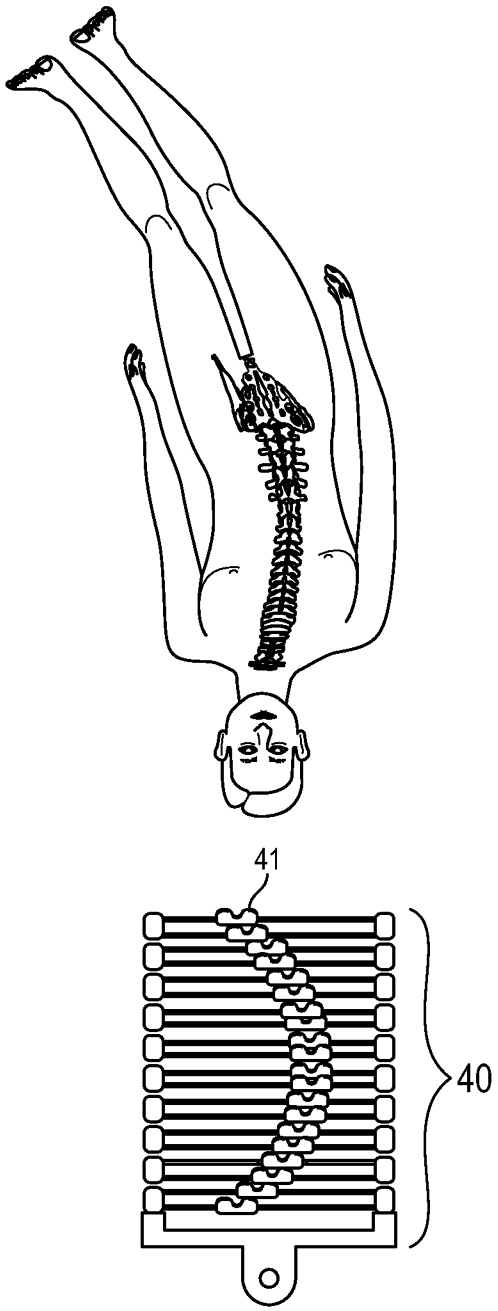

In some embodiments, some or all the frames 42 include springs 37 on both sides of the vertebrae support 41. As mentioned above, the vertebrae support 41 may move/slide on the frame 42 that it is on, along the z-axis. The springs 37 add some resistance to this movement of the vertebrae support 41 so the supports 41 are not loosely sliding around on the frame 42. Rather, the supports 41 would move only in response to a certain level of force applied, depending on the tension level on the spring 37. If a user bends to the side as shown in FIG. 9A and FIG. 9B below, she would move the vertebrae supports 41 such that even with the position change, her vertebrae remain supported. While the embodiment of FIG. 2 shows the spring 37 on every 6 frames, this is not a limitation of the inventive device and there may be more or fewer springs 37. Furthermore, springs 37 do not actually have to springs—they may be any mechanism that adds some resistance to the movement of the vertebrae support 41 along the frame 42.

Figure 3:
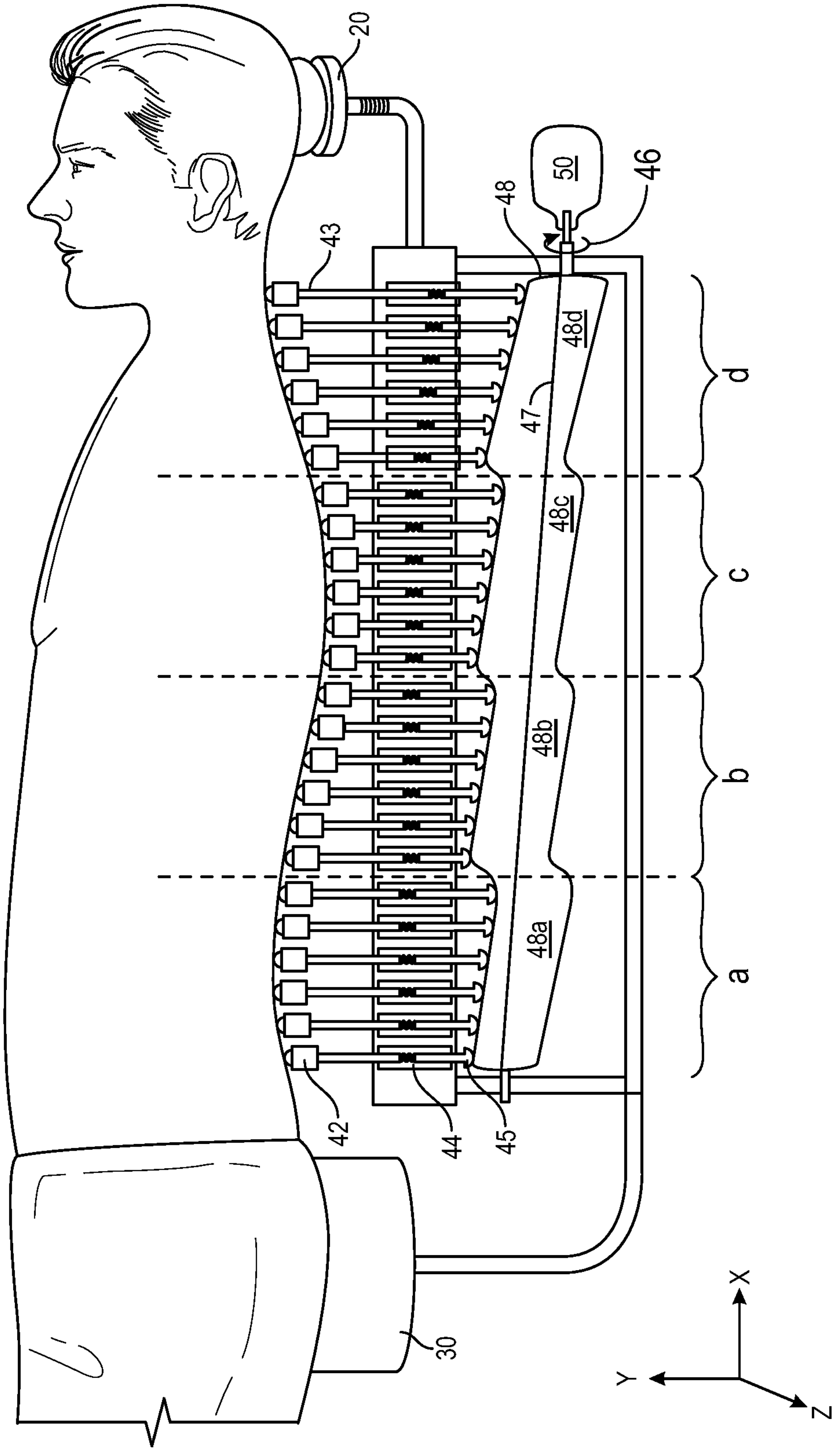
FIG. 3 depicts a side view of a spine exerciser in accordance with an embodiment of the disclosure.

FIG. 3 depicts a side view of the spine exerciser 10 with a user lying on it, in accordance with an embodiment of the disclosure. The frames 42 are not rigid, fixed pieces like floorboards. Rather, each of the 24 frames 42 is individually supported by a suspension piece 44 that allow the frames 42 to move in the y-direction. The suspension piece 44 includes a compressible piece (e.g., a spring) that connects to the frame 42 such that when a user lies down on the support surface 40, different suspension pieces 44 will compress to different degrees, causing the surface 40 to adjust to the contour of the user's back. Each of the 24 vertebrae should be individually supported by one of the vertebrae supports 41. In addition, the suspension piece 44 allows the supporting pieces 42 to also move in the y-direction in response to the user movement, making the user feel as though the supporting surface 40 is cushioned.

A first end (the top end in FIG. 3) of the suspension piece 44 is coupled to the frame 42, and a second end (the bottom end in FIG. 3) contacts a rotator 48. The second end of the suspension piece 44 includes a glider 45 that glides, slides, or rolls on the surface of the rotator 48 as the rotator 48 rotates in the direction shown by arrow 46. For example, the glider 45 of the suspension piece 44 may have a smooth, slippery surface, a roller ball, or a wheel. Any other type of surface that smoothly moves over the surface of the rotator 48 with little friction may be used as the glider 45. The rotator 48 turns about an axis 47 of rotation extending in the x-direction, controlled by a motor 50. The user may be able to start, stop, and adjust the speed of the motor 50, for example with a remote control or voice command.

The rotator 48, while generally resembling a cylinder extending in the x-direction, has an uneven surface. Hence, when the rotator 48 rotates, the suspension piece 44 that rests on its surface move up and down in the y-direction, outlining the contours of the outer surface of the rotator 48. The glider 45 and the suspension piece 44 allow this up and down motion to happen with little friction so that the user does not feel like she is on a "bumpy" surface.

As shown in FIG. 3, the 24 frames 42 are divided into four sections: section a, section b, section c, and section d, with six frames 42 in each section. If the frames 42 were numbered consecutively going from the hip support 30 to the head rest 20, a first section a would include supporting pieces #1 through #6, a second section b would include supporting pieces #7 through #12, a third section c would include supporting pieces #13 through #18, and the fourth section d would include supporting pieces #19 through #24. The suspension piece 44 is substantially the same for all 24 supporting pieces 42. The rotator 48 can also be divided into four subsections: 48*a*, 48*b*, 48*c*, and 48*d*, wherein each subsection has the same shape. In other words, the rotator 48 includes four identically-shaped subsections connected together.

Figure 4:
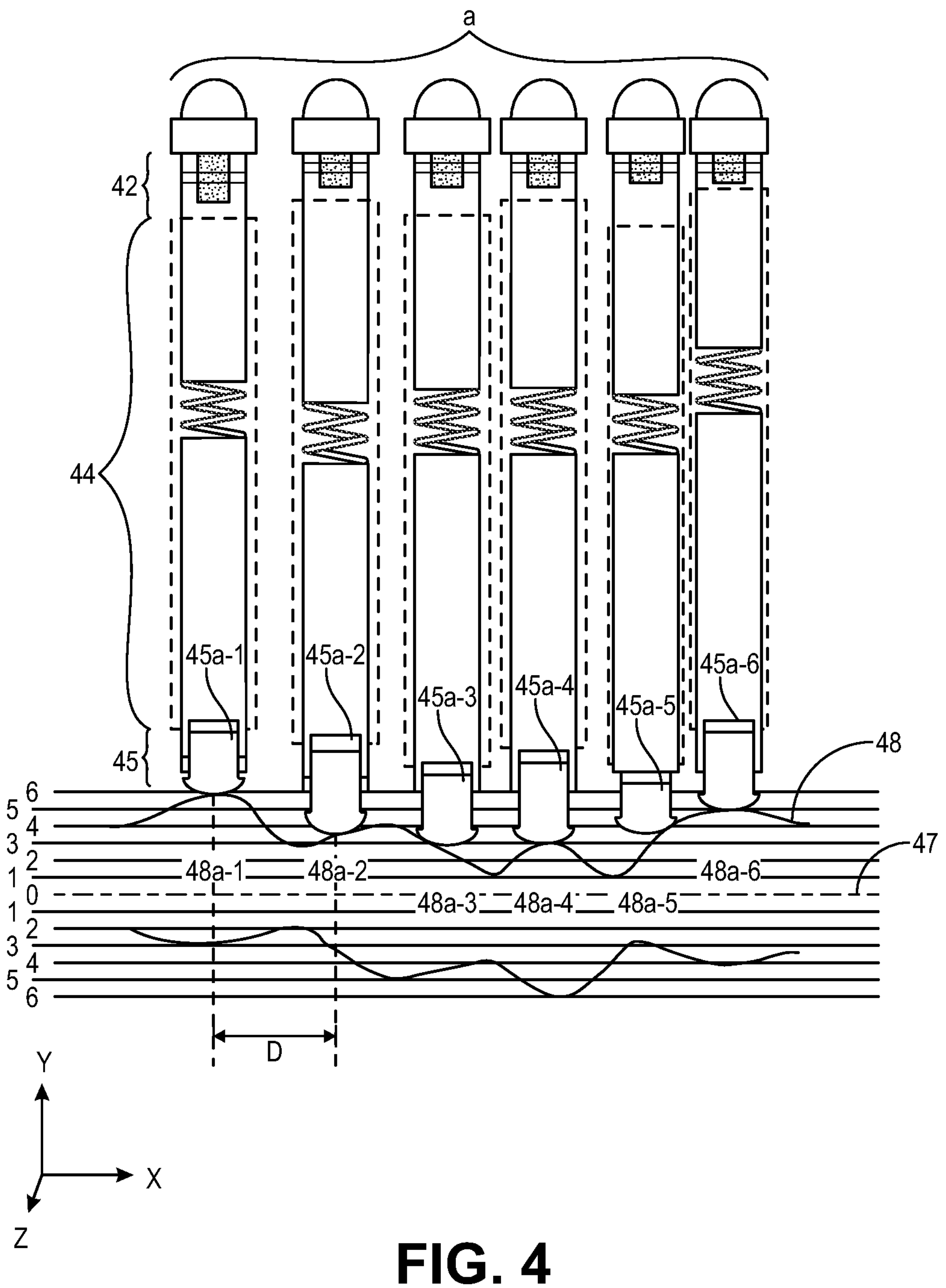
FIG. 4 depicts a side view of a section of the spine exerciser in accordance with an embodiment of the disclosure.

FIG. 4 depicts a side view of section a of the spine exerciser 10 in accordance with an embodiment of the disclosure. As the four sections a, b, c, and d are substantially alike, FIG. 4 could be a view of section b, section c, or section d. For clarity, parts of section a are given reference numerals with the letter "a" in it. For example, subsection 48*a* is the portion of the rotator 48 that is in section a, and glider 45*a* is a glider 45 that is in section a. The six frames 42 (and the gliders 45*a*-1, 45*a*-2, 45*a*-3, 45*a*-4, 45*a*-5, and 45*a*-6) in one section are separated by a distance D, as measured between the centerline of a glider 45 (e.g., glider 45*a*-1) and the adjacent glider 45 (e.g., 45*a*-2). As shown, the outer surface of the rotator 48 is uneven. However, the shape of the rotator 48 is not randomly uneven. Rather, the outer surface of the rotator 48 is shaped such that as the rotator rotates (e.g., at 5 rpm), the frames 42 move systematically to emulate an undulating, wave motion. This "undulating motion" is achieved by having the different gliders 45 contact the rotator 48 at different distances from the axis 47.

FIG. 4 depicts the rotator 48 against a measurement grid to illustrate its shape. One section of the rotator 48 (e.g., section 48*a* illustrated in FIG. 4) has six segments (48*a*-1, 48*a*-2, 48*a*-3, 48*a*-4, 48*a*-5, 48*a*-6). Each of the six gliders 45*a*-1, 45*a*-2, 45*a*-3, 45*a*-4, 45*a*-5, and 45*a*-6 contacts a unique segment of the rotator 48 at different points in the x-direction at the same time, time t1. Due to the shape of the rotator 48, the six gliders 45*a*-1, 45*a*-2, 45*a*-3, 4*a*5-4, 45*a*-5, and 45*a*-6 also contact the rotator 48 at different points in the y-axis. At time t1, the first glider 45*a*-1 contacts a point that is six units from the axis 47. At the same time, the second glider 45-2 contacts the rotator 48 at a point about 3.7 units from the axis 47, the third glider 45-3 contacts the rotator 48 at a point about two units from the axis 47, the fourth glider 45-4 contacts the rotator 48 at a point that is about three units from the axis 47, the fifth glider 45-5 contacts the rotator 48 at a point about 2.5 units from the axis 47, and the sixth glider 45-6 contacts the rotator 48 at a point about 4.3 units from the axis 47. Although the exact distances from the axis of rotation 47 are not a limitation of the inventive concept, there are six different distances from the axis 47 at which the six gliders 45*a*-1, 45*a*-2, 45*a*-3, 45*a*-4, 45*a*-5, and 45*a*-6 are positioned at time t1 in a certain order.

Each section of the rotator 48 has six segments, and each of the six segments contacts a unique suspension piece 44. Each of the segments has substantially the same cross-sectional shape, but it is rotated 60° about the axis 47 with respect to the adjacent segment. This aspect of the rotator 48 will be described in more detail below, in reference to FIG. 6 and FIG. 7.

Figure 5:
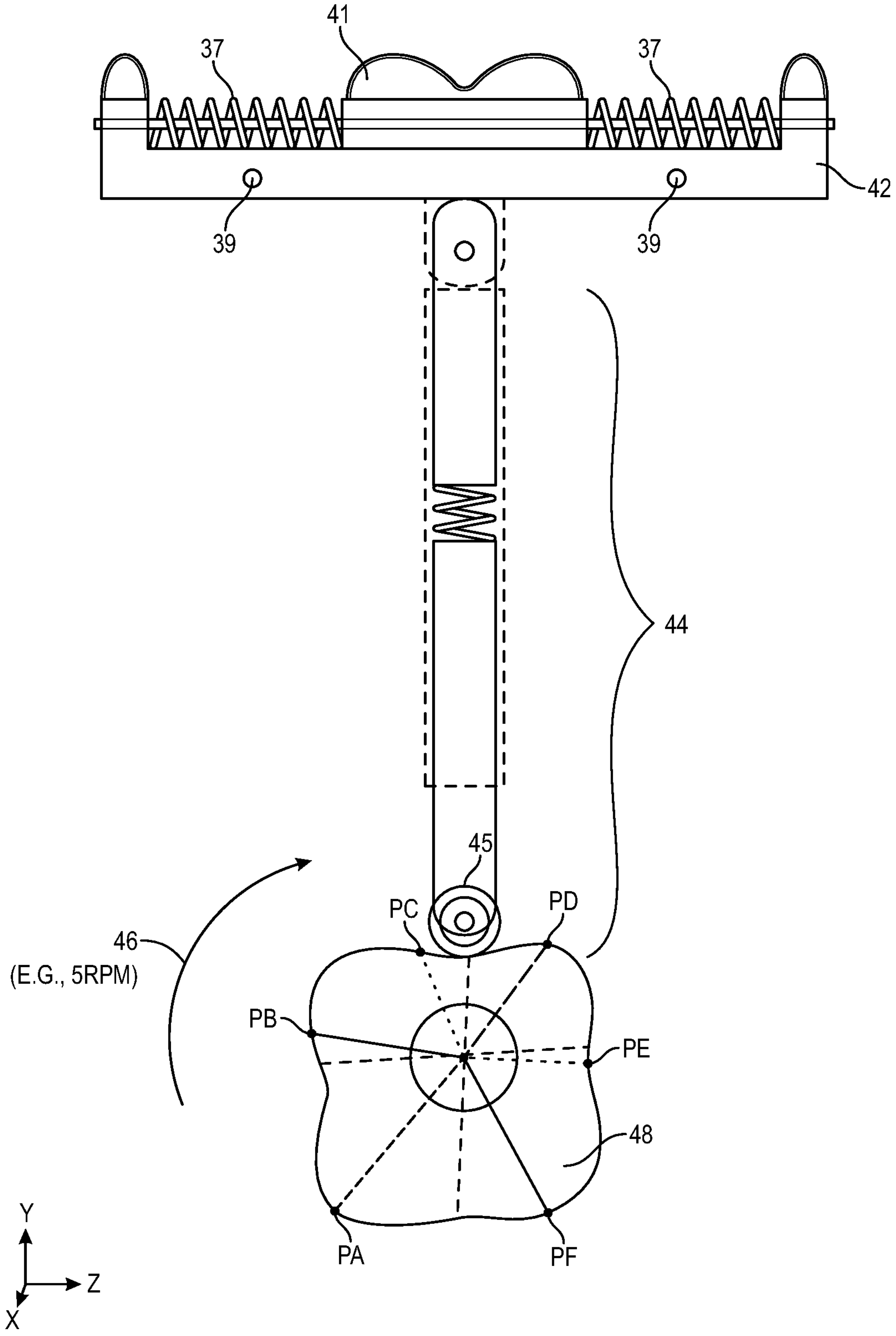
FIG. 5 depicts a cross-sectional view of the spine exerciser sliced in the y-z plane, in accordance with an embodiment of the disclosure.

FIG. 5 depicts a cross-sectional view of the spine exerciser 10 sliced in the y-z plane, in accordance with an embodiment of the disclosure. The cross-sectional view shows one of the frames 42 that makes up part of the support surface 40, the suspension piece 44 including the glider 45, and the rotator 48. In the embodiment of FIG. 5, the glider 45 is depicted as a wheel. However, this is not a limitation of the inventive concept as the glider 45 may be any surface that glides or smoothly rides the outer surface of the rotator 48 as the rotator 48 turns as shown by the arrow 46.

The cross-sectional view of FIG. 5 depicts an embodiment of the rotator 48 with an uneven outer surface, and the six points on the uneven surface. The six points, labeled PA, PB, PC, PD, PE, and PF, are the points on the cross sectional shape of the rotator 48 that would be contacted by the gliders 45-1, 45-2, 45-3, 45-4, 45-5, and 45-6, respectively, at the same time along the x-axis. As the rotator 48 turns in the direction indicated by the arrow 46, the glider 45-1 smoothly moves from Point A to Point B to Point C, etc. on the surface, causing the suspension piece 44 and therefore the frame 42 to smoothly move in the y-axis. The time it takes for the glider 45 to go from one point (e.g., Point A) to the next point (e.g., Point B) is Δt. At the same time that the glider 45-1 is moving as described above, glider 45-2 is moving from Point B to Point C to Point D, etc. distance D away in the x-axis. Table 1 below summarizes the contact points of the six gliders with time, as the rotator 48 rotates.

TABLE 1

| | Positions of the Gliders as Rotator turns | | | | | |
|---|---|---|---|---|---|---|
| | 45-1 | 45-2 | 45-3 | 45-4 | 45-5 | 45-6 |
| t1 | Point A | Point B | Point C | Point D | Point E | Point F |
| t2 | Point F | Point A | Point B | Point C | Point D | Point E |
| t3 | Point E | Point F | Point A | Point B | Point C | Point D |

TABLE 1-continued

| | Positions of the Gliders as Rotator turns | | | | | |
|---|---|---|---|---|---|---|
| | 45-1 | 45-2 | 45-3 | 45-4 | 45-5 | 45-6 |
| t4 | Point D | Point E | Point F | Point A | Point B | Point C |
| t5 | Point C | Point D | Point E | Point F | Point A | Point B |
| t6 | Point B | Point C | Point D | Point E | Point F | Point A |

Figure 6:
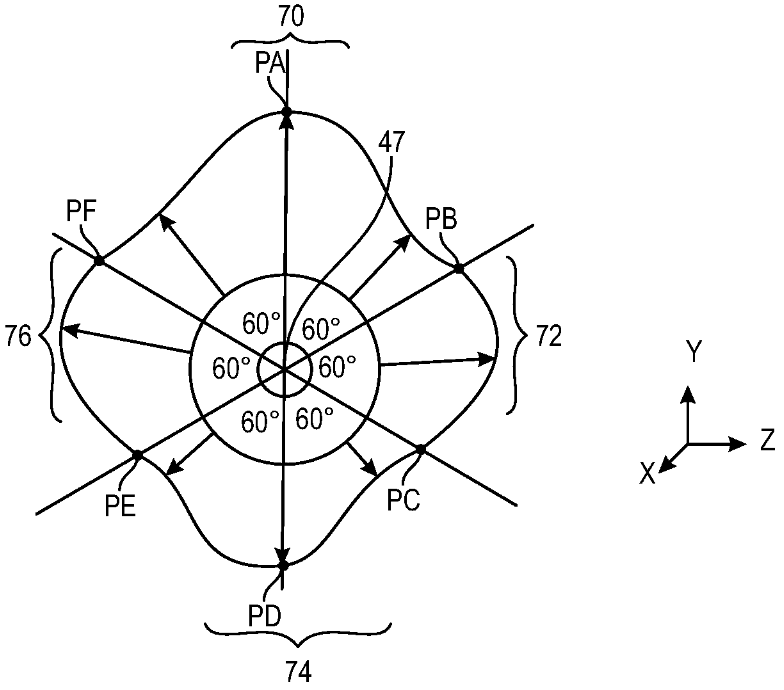
FIG. 6 depicts a cross section of the rotator of the spine exerciser in accordance with an embodiment of the disclosure.

FIG. 6 depicts a cross-sectional view of the rotator 48 in accordance with an embodiment of the disclosure. In this embodiment, there are four protruding portions 70, 72, 74, and 76 to the cross section. The four protruding portions 70, 72, 74, 76 extend different distances from the axis of rotation 47, giving the cross section an asymmetrical shape. A first protruding portion 70 is 6 units high at its peak, a second protruding portion 72 is 4 units high at its peak, a third protruding portion 74 is three units high at its peak, and a fourth protruding portion 76 is five units high at its peak, as measured from the axis of rotation 47.

The six points—PA, PB, PC, PD, PE, and PF—are shown on the cross-sectional view of FIG. 6, at 60° angular interval around the axis of rotation 47. As described above and shown in Table 1, when the first glider 45-1 is in contact with point A, which happens to be the peak of the first protruding section 70, the second glider 45-2 is in contact with point B, the third glider 45-3 is in contact with point C, the fourth glider 45-4 is in contact with point D, the fifth glider 45-5 is in contact with point E, and the sixth glider 45-6 is in contact with point F.

Figure 7:
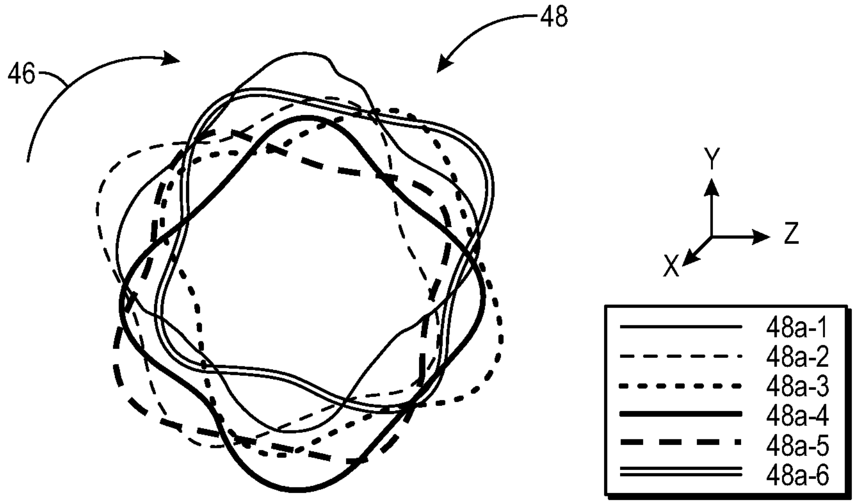
FIG. 7 depicts cross sections of the six segments of a rotator section in accordance with an embodiment of the disclosure.

As mentioned above, each section of the rotator 48, for example the section 48*a*, includes six segments. The six segments have the same cross-sectional shape, but they are rotated 60° with respect to the neighboring segment. FIG. 7 depicts cross sections of the six segments in subsection a in accordance with an embodiment of the disclosure. The six segments depicted in FIG. 7 may correspond to the six segments 48*a*-1, 48*a*-2, 48*a*-3, 48*a*-4, 48*a*-5, and 48*a*-6 depicted in FIG. 4. When the thin solid line represents a cross section of section 48*a*-1 at time t1, the broken line, the dotted line, the thick solid line, the thick broken line, and the double line represent sections 48*a*-2, 48*a*-3, 48*a*-4, 48*a*-5, and 48*a*-6, respectively, at the same moment t1 looking into the x-direction. The transition between the segments is smooth and continuous, such that the 60° turn between segments happens evenly over distance D in the x-direction.

Figure 8A:
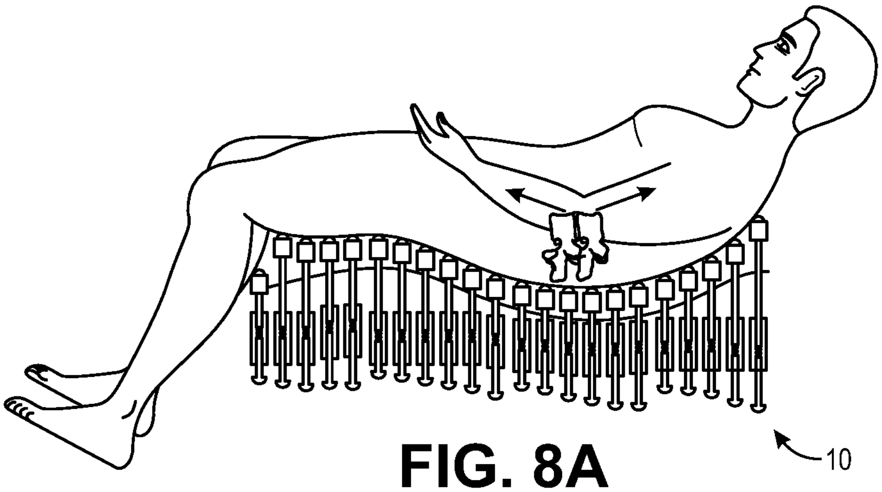
FIG. 8A and FIG. 8B depict different ways in which the spine exerciser can shape the supporting surface in accordance with an embodiment of the disclosure.
Figure 8B:
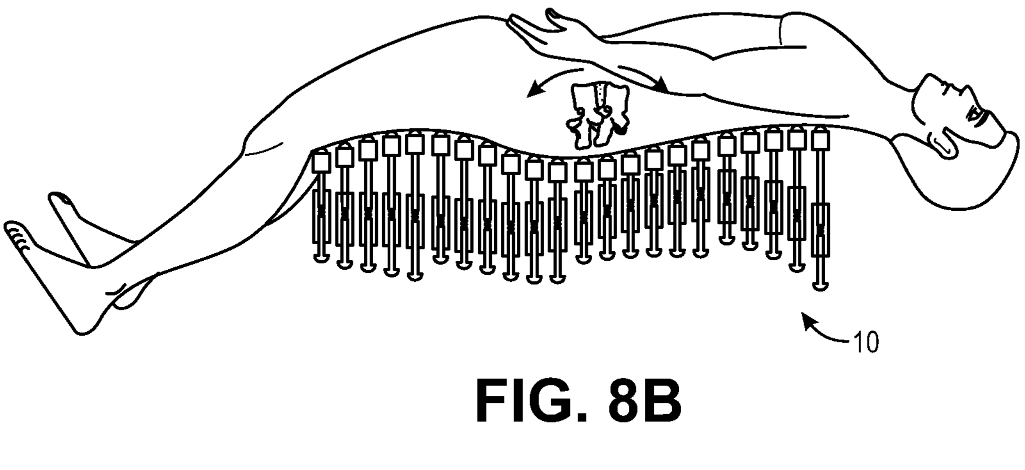

FIG. 8A and FIG. 8B depict different ways in which the spine exerciser 10 can shape the supporting surface 40 in accordance with different embodiments. FIG. 8A depicts how the support surface 40 can form a dip to stretch the part of the vertebrae that is closest to the surface 40. FIG. 8B depicts how the support surface 40 can form a "bump" portion to stretch the part of vertebrae that is farthest from the surface 40. The surface contours of the support surface 40 adapts to the shape of the user's back and any force applied by the user due to the suspension piece 44 being compressed to different degrees. The user can move the position of her body between the position depicted in FIG. 8A and the position depicted in FIG. 8B while the rotator 48 is rotating. If the rotator 48 rotates in direction 46 as depicted in FIG. 7, the support surface 40 moves in an undulating motion to stretch the bottom and top portions of each vertebrae one vertebrae at a time.

Figure 9C:
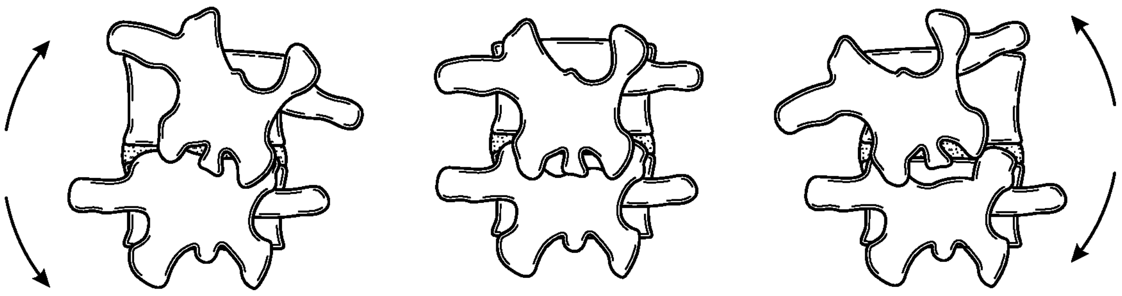
FIG. 9C depicts an enlarged view of two vertebrae in neutral position.

FIG. 9A and FIG. 9B depict how the vertebrae supports 41 may individually move along the frame 42 in the z-direction in response to the user's stretching or bending her body sideways, in accordance with an embodiment of the disclosure. FIG. 9C depicts the vertebrae in neutral position, when the user is lying down. By moving the vertebrae supports 41 to the left and to the right in the manner shown in FIGS. 9A and 9B, the left and right sides of the vertebrae are stretched. Due to the presence of the elastic strings 39, the user feels some resistance to stretching sideways as shown in FIG. 9A and FIG. 9B.

Figure 10A:
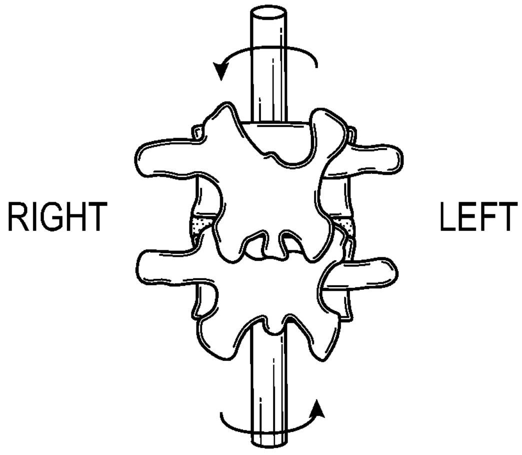
FIG. 10A, FIG. 10B, and FIG. 10C depict.
Figure 10B:
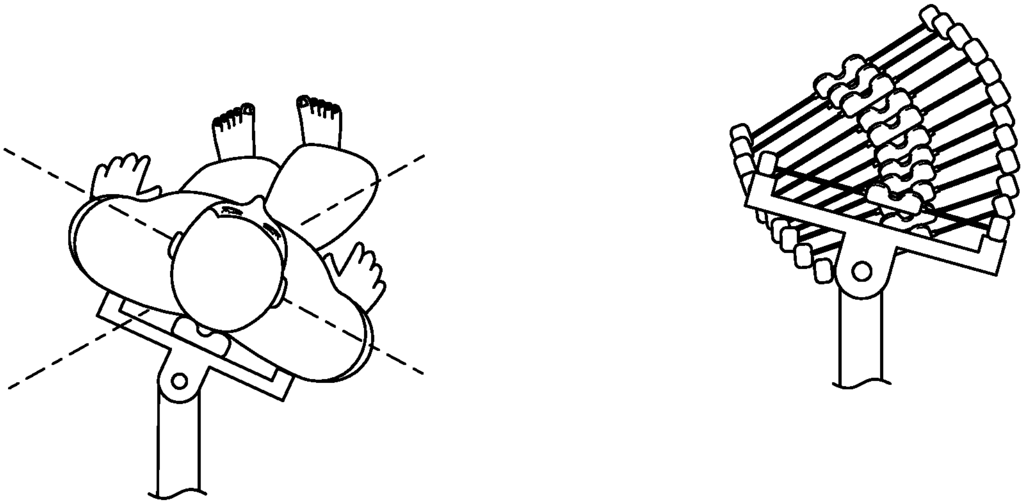
Figure 10C:
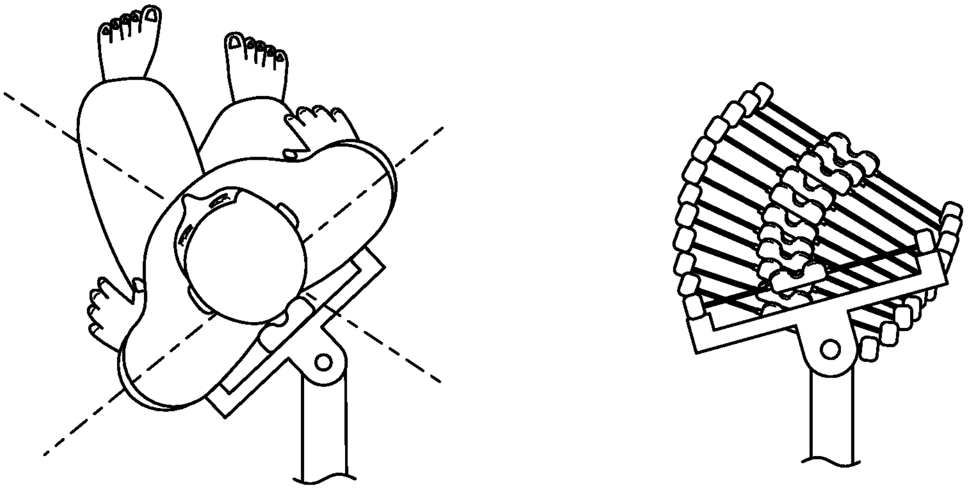

FIG. 10A, FIG. 10B, and FIG. 10C depict how the support surface 40 may twist in different directions in accordance with an embodiment. When the user is lying down on the support surface 40 and twists her body as depicted in FIG. 10B and FIG. 10C, the frames 42 rotate about the vertebrae axis 43 (see FIG. 2) that extends in the x-direction. The user's vertebrae gets rotated as depicted in FIG. 10A, "exercising" or "treating" the user's vertebrae.

Figure 11:
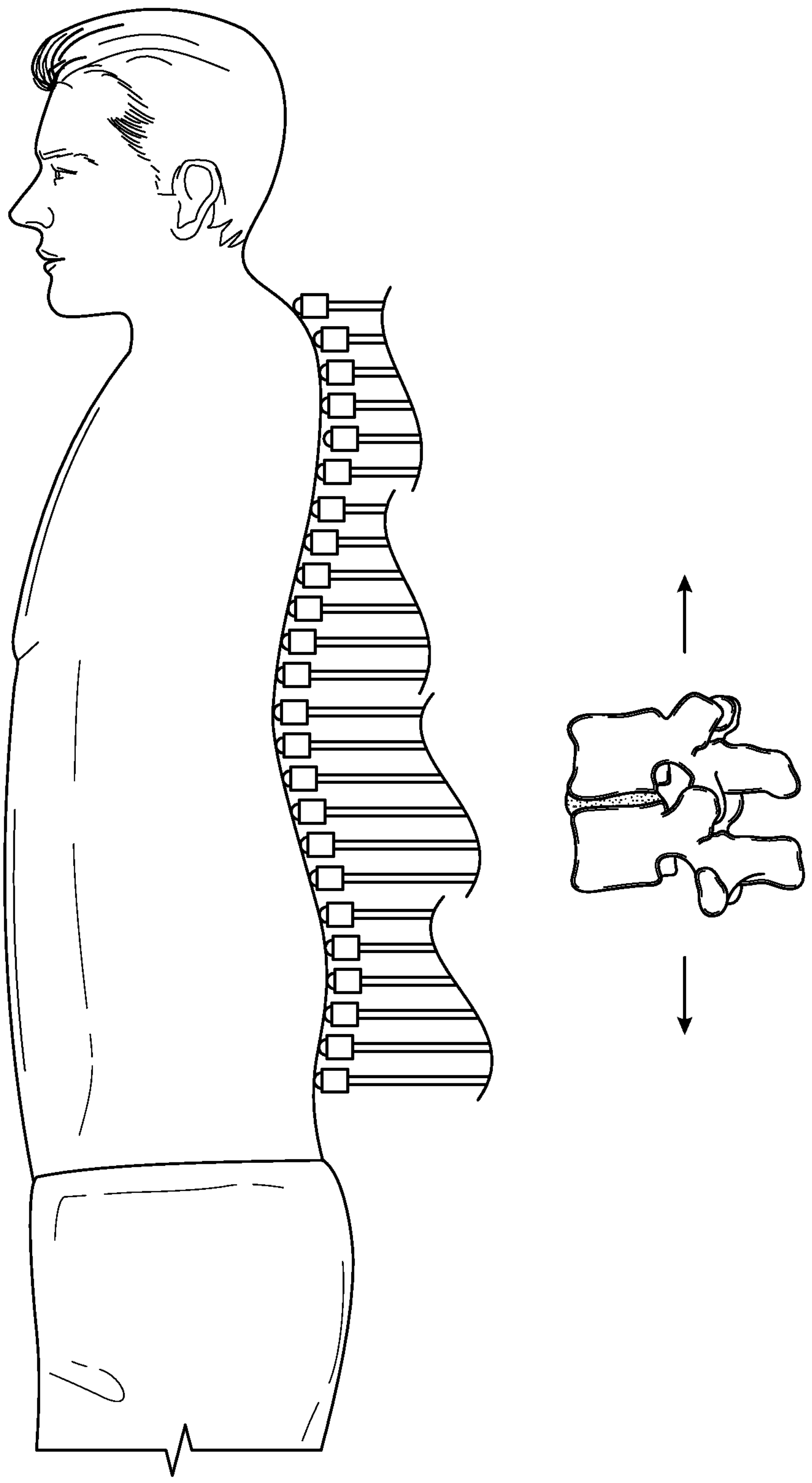
FIG. 11 depicts the support surface of a spine exerciser twisting to turn a user's vertebrae.

FIG. 11 depicts the effect of the rotator 48 turning on a patient's vertebrae. As the support surface 40 undulates in response to the motor 50 turning the rotator 48, the vertebrae get stretched away from each other as depicted. Where the rotator 48 is shaped in the manner depicted in FIG. 4, the vertebrae supported by the four sections a, b, c, d are treated or stretched the same way. For example, the first and second vertebrae in sections a, b, c, and d are stretched the same way at the same time.

In the preceding specification, the inventive concept has been described with reference to specific exemplary embodiments. It will, however, be evident that various modifications and changes may be made without departing from the broader spirit and scope of the inventive concept as set forth in the claims that follow. The specification and drawings are accordingly to be regarded as illustrative rather than restrictive. Other embodiments of the disclosure may be apparent to those skilled in the art from consideration of the specification and practice of the concept disclosed herein.

What is claimed is:

1. A spine treating apparatus comprising:

a support surface made of a plurality of frames arranged in an x-direction, the plurality of frames extending in a z-direction that is perpendicular to the x-direction and being capable of moving independently of one another;

a plurality of suspension pieces having a first end and a second end, wherein each of the plurality of frames is connected to the first end of one of the suspension pieces;

a rotator comprising a plurality of protrusions forming an uneven outer surface, the second end of the suspension pieces resting on the uneven outer surface; and a motor that turns the rotator about an axis that extends in the x-direction with the second end of the suspension pieces resting on a portion of the rotator that is closest to the support surface and changes a point of contact on the rotator's outer surface as the rotator turns.

2. The spine treating apparatus of claim 1, wherein the uneven outer surface has an asymmetrically-shaped cross section with varying radiuses measured from the axis.

3. The spine treating apparatus of claim 1, wherein the rotator comprises four identically-shaped sections connected together.

4. The spine treating apparatus of claim 3, wherein each of the sections has six segments separated by a distance interval D, wherein the six segments have the same cross section rotated 60° with respect to an adjacent one of the six segments.

5. The spine treating apparatus of claim 4, wherein there are 24 suspension pieces supporting 24 frames, and one of the suspension pieces contacts each one of the segments.

6. The spine treating apparatus of claim 1, wherein the plurality of suspension pieces maintain contact with the rotator as the rotator turns.

7. The spine treating apparatus of claim 6, further comprising one or more of a wheel, a ball, and a slippery surface at the second end of each of the suspension pieces.

8. The spine treating apparatus of claim 1 wherein the support surface undulates in response to the rotator turning.

9. The spine treating apparatus of claim 1 wherein the plurality of suspension pieces are arranged in a row in the x-direction.

10. The spine treating apparatus of claim 1, wherein the suspension pieces compress in response to force on the frames and contours of the rotator.

11. The spine treating apparatus of claim 1, wherein the plurality of frames individually turn about a vertebrae axis that extends through a center of the plurality of frames.

12. The spine treating apparatus of claim 1, wherein at least one of the plurality of frames comprises a vertebrae support piece that is held in position by a spring but moves in the z-direction in response to force on the support surface.

13. A method of treating a user's spine, comprising:

arranging a plurality of frames in an x-direction to form a support surface, wherein at least one of the plurality of frames extends in a z-direction perpendicular to the x-direction and moves independently of the other frames;

providing suspension pieces, each having a first end and a second end, wherein each of the plurality of frames is connected to the first end of one of the suspension pieces;

providing a rotator comprising a plurality of protrusions forming an uneven outer surface, wherein the second end of the suspension piece rests on the rotator; and turning the rotator about a first axis that extends parallel to the x-direction, with the second end of each of the suspension pieces resting on a portion of the rotator that is closest to the support surface and changes a point of contact on the rotator's outer surface as the rotator turns.

14. The method of claim 13, wherein the rotator has an asymmetrically-shaped cross section with varying radiuses measured from the axis.

15. The method of claim 13, wherein the rotator comprises four identically-shaped sections connected together, and each of the sections comprises six segments that are rotated 60° about the axis relative to an adjacent one of the six segments.

16. The method of claim 13, further comprising providing one or more of a wheel, a ball, and a slippery surface at an end of the suspension piece closest to the rotator.

17. The method of claim 13, further comprising configuring the frames to rotate about an axis that is parallel to the x-axis and extends through a center of the frames.

18. The method of claim 13, further comprising providing a vertebrae support piece connected to at least one of the plurality of frames, wherein the vertebrae support piece is held in position by a spring but moves in the z-direction in response to force on the support surface.

* * * * *